United States Patent [19]

Guanciale

[11] Patent Number: 4,873,891
[45] Date of Patent: Oct. 17, 1989

[54] APPARATUS FOR IMPROVING EFFICIENCY AND CONSISTENCY OF A DRAG RACE CAR

[76] Inventor: Gary Guanciale, 500 Eagle La. #4, Camillus, N.Y. 13031

[21] Appl. No.: 286,090

[22] Filed: Dec. 19, 1988

[51] Int. Cl.$^4$ ............................................. B60K 20/02
[52] U.S. Cl. ....................................... 74/625; 73/117; 74/336 R; 74/473 R
[58] Field of Search .................. 74/335, 336 R, 336.5, 74/625, 866, 473 R; 73/116, 117

[56] References Cited

U.S. PATENT DOCUMENTS

| | | | |
|---|---|---|---|
| 3,516,287 | 6/1970 | Masuda et al. | 73/117 |
| 3,713,332 | 1/1973 | Herrbrich | 73/117 |
| 4,466,279 | 8/1984 | Gable et al. | 74/473 R X |
| 4,554,824 | 11/1985 | King et al. | 73/117 |
| 4,610,179 | 9/1986 | Parker | 74/335 |
| 4,649,742 | 3/1987 | Klausnitzer et al. | 73/117 |

*Primary Examiner*—Dwight G. Diehl
*Attorney, Agent, or Firm*—Charles S. McGuire

[57] ABSTRACT

A system for automatically shifting the gears of a drag racing car transmission each time engine RPM reaches a predetermined level after leaving the starting line. The actual value of the predetermined level may be selectively adjusted by means of a potentiometer connected to the vehicle tachometer. A manually operable switch permits adjustment while racing an eight cylinder engine to only one-half the predetermined RPM level during adjustment. Additional potentiometers are preferably provided for limiting engine RPM to a first maximum value while racing the engine with the vehicle in first gear and held stationary at the starting line by the foot brake, and a second, higher, maximum value after leaving the starting line, both the first and second maximum RPM values being selectively and independently adjustable. Control of maximum RPM level is automatically changed from the first to the second value by movement of the throttle to the fully open position when leaving the starting line, and remains in this mode for a predetermined time period established by an electronic timer.

12 Claims, 1 Drawing Sheet

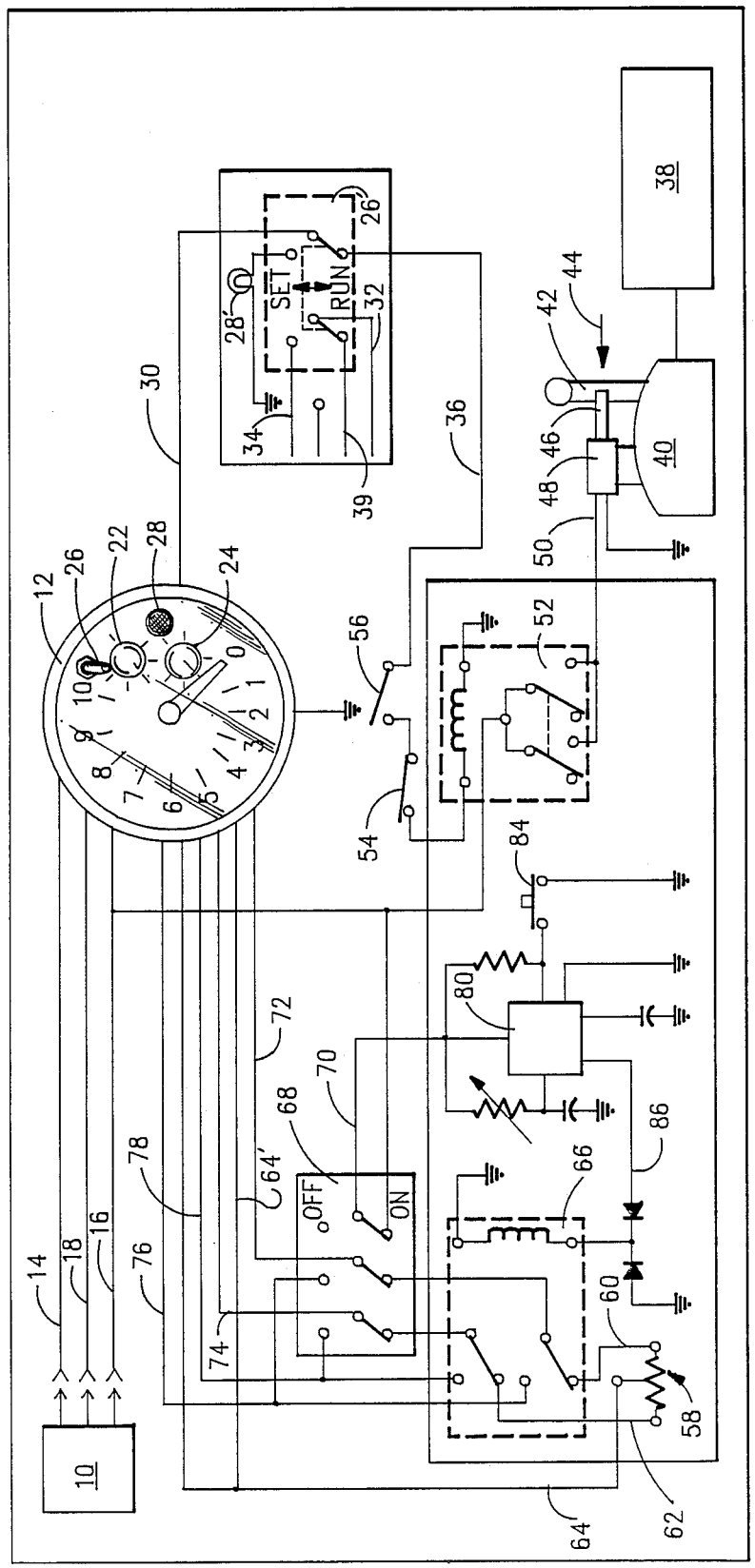

APPARATUS FOR IMPROVING EFFICIENCY AND CONSISTENCY OF A DRAG RACE CAR

BACKGROUND OF THE INVENTION

The present invention relates to apparatus for mounting on a drag racing car to effect shifting of the automatic transmission precisely at a desired engine RPM, as well as to insure that the engine does not exceed certain maximum RPM levels. More specifically, the invention concerns electrical apparatus such as switches, relays, potentiometers and solenoids which operate in conjunction with a tachometer to provide automatic shifting at a selectively adjustable, predetermined RPM level, and limiting of the maximum RPM level.

According to established rules, the sport of drag racing involves accelerating a car from a standing start to a finish line, usually over a distance of ⅛ or ¼ mile, in the shortest possible time. In order to achieve the optimum, shortest time for a given car, the driver must leave the starting line with the engine operating at an optimum RPM level, and must shift successively from lower to higher gears each time the engine reaches further optimum RPM levels. At the same time, the driver must ensure that the engine does not exceed certain maximum RPM levels in order to avoid possible damage to or destruction of the engine or other parts of the car. To this end, drag racing cars are provided with tachometers in order that the driver may be continually aware of the engine RPM level. However, constant observation of the tachometer diverts the driver's attention from the other aspects of vehicle operation.

Means have been provided to limit the maximum RPM of the engine while stationary at the starting line by applying a proportional ground to the ignition coil when the RPM level reaches a predetermined maximum. However, such devices are normally incorporated in an electronic device which determines the maximum RPM level, and which must therefore be replaced by another such device in order to change the level since this is a feature built into the device. Hence, there exists a need for means which permit selective adjustment of maximum RPM levels both at the starting line, as well as during a race, as well as means for automatically shifting to successively higher gears each time the engine reaches a selectively adjustable, predetermined RPM level.

In a general sense, the principal object of the present invention is to provide means for improving and optimizing performance of a drag racing car.

A more specific object is to provide means for automatically moving the shift lever of an automatic transmission to shift to successively higher gears each time the engine reaches a predetermined RPM level, including means for selective adjustment of such level.

A further object is to provide means for selective adjustment of the maximum RPM level of a drag racing vehicle engine both while racing the engine with the transmission engaged and the vehicle held stationary by the brakes at the starting line, and while the vehicle is in motion during a race.

Another object is to provide means for adjustment of RPM levels by bringing the engine to only one-half the actual operating level during the adjustment operation, thereby saving wear and tear on the engine.

A still further object is to provide means for limiting the maximum RPM level of a drag racing engine to a first value at the starting line and a second, higher value during a race, wherein normal operation of the vehicle causes a change from the first to the second maximum level.

Other objects will in part be obvious and will in part appear hereinafter.

SUMMARY OF THE INVENTION

The apparatus of the invention is incorporated in an otherwise conventional drag racing car having the usual engine, electrical system, automatic transmission and tachometer. A ratchet device, also of conventional design, is coupled to the transmission shift lever to permit movement thereof from a first position, in a single direction, in discrete increments to shift to successively higher gears. The movable armature of a solenoid is positioned to move the shift lever upon each actuation of the solenoid, such actuation being effected through a relay which is energized by an electrical output produced each time the engine RPM level reaches a predetermined value.

The predetermined RPM level at which automatic shifting occurs is selectively adjustable by means of a first potentiometer on the tachometer from which a line is connected to the coil of the aforementioned relay, whereby an output appears on the line to energize the relay each time the RPM level reaches the predetermined value. A manually controlled switch is placed in a first ("set") position during adjustment of the first potentiometer by racing the engine, with the transmission disengaged, to the desired shifting RPM while manually turning the potentiometer knob. When the first potentiometer is properly adjusted a lamp bulb turns on, indicating an output on the line which is connected to the relay coil when the switch is moved to a second ("run") position. Two additional switches are arranged in series in the line to the relay coil, one a manually operated master switch and the other a normally closed switch which is opened by movement of the transmission lever to the highest desired gear.

In addition to the automatic shifting feature, the maximum RPM level of the engine ma be selectively adjusted to both a first level, operative while the engine is being raced at the starting line with the car stationary, and a second level, operative after leaving the starting line and during the race. An electronic timing means is activated by closing a switch in response to movement of the throttle to the fully open position as the car leaves the starting line. The timer is connected to the coil of a second relay which is energized at the beginning of the timing period, which is greater than the time required for the car to finish the race. In addition to the aforementioned first potentiometer for adjusting the RPM level at which shifting occurs, second and third potentiometers may be selectively adjusted, as described later herein, to limit maximum engine RPM at the first and second levels, respectively.

BRIEF DESCRIPTION OF THE DRAWING

The single drawing FIGURE is a partly schematic, partly diagrammatic illustration of the invention in combination with certain elements of a drag racing vehicle.

DETAILED DESCRIPTION

Referring now to the drawing, the vehicle engine compartment is indicated by reference numeral 10.

Conventional tachometer 12 is connected by line 14 to the vehicle lighting circuit, providing power to the usual tachometer panel light (not shown), and by line 16 to the vehicle DC power supply (+12 v). Tachometer 12 is also connected by line 18 to the negative side of the ignition coil to cause needle 20 to provide an accurate indication of engine RPM ($\times 1,000$) in the usual manner. In the illustrated embodiment, potentiometer adjustment knobs 22 and 24, and lamp bulb 28 are also mounted on the face of tachometer 12, as is conventional on the tachometers of certain racing vehicles. Knob 22 is used to adjust maximum engine RPM, after leaving the starting line. Knob 24 controls the RPM level at which lamp 28 comes on, providing a visual indication by lamp 28 of when the desired shifting RPM is reached in such vehicles. Switch 26 is added to provide operational features of the present invention, as explained below.

Switch 26 is a double pole, double throw switch, shown separately in schematic form where it is denoted by reference numeral 26'. Lamp 28 is also shown schematically at 28' to illustrate its connection to switch 26. The two positions of switch 26 are denoted as "SET" and "RUN". In the SET position, potentiometer 24 is connected by line 30 to lamp 28 through one set of switch contacts and lines 32 and 34 are connected to one another through the other set. In the RUN position (as shown), line 30 is connected to line 36 through the first set of switch contacts, and lines 32 and 39 are connected through the other. Lines 32, 34 and 39 are connected to terminals within tachometer 12 in conventional fashion to cause needle 20 to indicate actual engine RPM for an eight cylinder engine, when line 32 is connected to line 39, and for a four cylinder engine, when line 32 is connected to line 34. Thus, when used in the usual eight cylinder vehicle, needle 20 indicates twice actual RPM when line 32 is connected to line 34, i.e., when switch 26 is in the SET position.

The automatic transmission of the vehicle is represented by the box bearing reference numeral 38. Ratchet mechanism 40, of commercially available design, is connected to transmission 38 to control shifting of the gears in successive increments, from lower to higher gears, as shift lever 42 is moved in the direction of arrow 44. Armature 46 of solenoid 48 is connected to shift lever 42 to effect movement thereof in the direction of arrow 44 upon actuation of solenoid 48. The solenoid coil is connected by line 50 to both of the normally open contacts of relay 52. The coil of relay 52 is connected through switches 54 and 56 to line 36. Switch 54 is a normally closed microswitch physically positioned for opening by movement of ratchet mechanism 40 to shift transmission 38 to the highest gear.

Prior to a race, the driver or mechanic decides upon the engine RPM level at which gear shifting should occur in order to achieve optimum racing performance in a particular vehicle. For illustrative purposes, this will be assumed to be 7,000 RPM. With the engine running, and the transmission in "park," switch 26 is placed in the SET position, connecting line 30 to bulb 28 and line 32 to line 34, the four-cylinder mode. Thus, since the vehicle has an 8 cylinder engine, as most drag racing cars do, tacometer needle 20 will provide a reading which is twice the actual RPM of the engine. The setting of potentiometer knob 24, which is calibrated in RPM, controls the engine speed at which an output appears on line 30.

The operator then races the engine to bring tachometer needle 20 to a reading of 7,000 RPM, although the engine is actually operating at only 3,500 RPM. Knob 24 is turned to adjust the associated potentiometer until lamp 28 comes on, indicating an output on line 30. This setting is checked by racing the engine from a speed below to a speed above 7,000 RPM; each time needle 20 reaches the 7,000 RPM reading, lamp 28 should come on. Any necessary fine adjustments are made until this condition is achieved.

Before approaching the starting line, the driver places switch 26 in the RUN position. At the starting line, the driver places transmission 38, through ratchet mechanism 40, in the lowest (1st) forward gear position, holding his foot on the brake pedal to prevent movement of the vehicle, and turns master switch 56 on (closed) to render the system operative. The engine is raced up to a first, predetermined maximum RPM level, considerably below 7,000 RPM and controlled in a manner explained later, until the "go" signal is received. After leaving the starting line, RPM may increase beyond the first maximum level, up to a second, predetermined maximum level, above 7,000 RPM and also controlled in a manner explained later. When the engine reaches 7,000 RPM an output (12 v DC) will appear on line 30 and, through switch 26, line 36, and switches 56 and 54, will energize the coil of relay 52. The normally open contacts of relay 52 will be closed, connecting line 50 to line 16, thereby actuating solenoid 48, moving shift lever 42 and causing transmission 38 to be placed in the next highest (2nd) gear. Both sets of relay 52 contacts are used since solenoid 48 is of heavy duty design, drawing 20 amps of current. Engine RPM level immediately drops, removing the output on line 30, deenergizing relay 52, causing the contacts thereof to reopen. When the engine again reaches 7,000 RPM, the process is repeated and transmission 38 is automatically shifted to the next highest (3rd) gear. Since this is the highest gear in which the vehicle is intended to operate, switch 54 is opened by the action of ratchet mechanism 40, as previously explained, and the automatic shifting system is rendered inoperative.

Turning now to the RPM limiting means of the invention, a further potentiometer 58 is connected on one side to line 60 and on the other side to line 62. The adjustable center tap of potentiometer 58 is connected to line 64. Lines 60 and 62 are connected to the normally closed pair of contacts of relay 66, and thence to two contacts of manually operable, triple pole, double throw switch 68, shown in the "on" position, where the third contacts connect line 16 to line 70. Also, lines 60 and 62 are connected to lines 72 and 74, respectively, thereby connecting potentiometer 58 in the RPM limiting circuit (not shown) of tachometer 12. Such circuits are conventionally provided in tachometers, particularly those intended for use on racing vehicles, to apply a proportional ground to the ignition coil, causing the engine to falter and ultimately to stay below selected engine RPM predetermined by potentiometers 22 and 58. Potentiometer 58 is used to adjust the maximum RPM level when the vehicle is at the starting line, held in a stationary position by the foot brake while racing the engine with the transmission in first gear. Means for limiting maximum engine RPM in this mode have previously been provided and are commonly referred to as "line launch RPM limiters." However, such means have previously been incorporated in fixed electronic means, such as an integrated circuit chip, which must be removed and replaced by another such device in order to change the maximum RPM level.

The RPM limiting circuit conventionally provided in tachometer 12 is normally used for limiting maximum RPM when the vehicle is being operated in the usual manner, i.e., other than when the transmission is in a forward gear and the vehicle is held stationary by the brakes. This maximum RPM level is adjustable by means of the potentiometer which is controlled by knob 22. In order to implement the adjustable line launch RPM limiter of the present invention while also limiting maximum RPM at a higher level during normal operation, the outside wires of the potentiometer by which knob 22 is controlled are disconnected from the tachometer RPM limiting circuitry and connected to lines 72 and 74. The adjustable center tap remains connected and line 64', connected through line 64 to the center tap of potentiometer 58, is connected thereto. When switch 68 is in the "off" position, lines 72 and 74 are connected thereby to lines 76 and 78, respectively, thus connecting the potentiometer of knob 22 in the RPM limiting circuit of tachometer 12. When switch 68 is in the "on" position, lines 72 and 74 are connected, through the normally closed contacts of relay 66, to lines 60 and 62, respectively, and thus to opposite sides of potentiometer 58, as previously stated. When relay 66 is energized, lines 72 and 74 are connected to lines 76 and 78, respectively.

Electronic timing circuit 80 is connected by line 82 to the third set of contacts of switch 68, and thus to the power supplied on line 16 when switch 68 is in the "on" position. Timing circuit 80 becomes operative upon connection to ground potential through switch 84. This switch is physically positioned for movement by the throttle linkage, being closed by movement of the throttle to the fully open position when the driver pushes the accelerator pedal fully to the floor when receiving the "go" signal, and being open in all other throttle positions. During the period that timing circuit 80 remains operative, e.g., 2 minutes, an output is provided on line 86 to maintain relay 66 in an energized condition, thereby connecting lines 72 and 74 to lines 76 and 78, respectively, making the potentiometer of knob 22 operative to control the maximum RPM level.

Potentiometer 58 is adjusted to limit line launch RPM at a desired level by placing switch 68 in the "on" position, thereby disconnecting the potentiometer of knob 22 from and connecting potentiometer 58 to the tachometer RPM limiting circuit, and racing the engine to the desired line launch RPM. This value is selected in accordance with the characteristics of the particular vehicle, such as the torque converter and brakes. That is, the maximum line launch RPM must not exceed the level which may be safely applied to the torque converter, and which the brakes are capable of holding while the transmission is in first gear and the vehicle is held stationary. For illustrative purposes, this will be assumed to be 3,200 RPM. While racing the engine to 3,200 RPM, as indicated by tachometer 12, (with the transmission in neutral or park) potentiometer 58 is adjusted from a higher setting downward until the engine begins to falter, indicating that the proportional ground is being applied to the ignition coil by the tachometer RPM limiting circuit. Maximum RPM will then be limited to 3,200 when potentiometer 58 is connected in the limiting circuit.

The maximum RPM level when operating under normal conditions, with the potentiometer controlled by knob 22 connected in the limiting circuit, is set at, for example, 500 RPM above the previously discussed gear shifting RPM level. This level is adjusted by placing switch 68 in the "off" position and knob 22 in a position permitting the RPM to go above the desired maximum level, e.g., 7,500 RPM. With switch 26 in the SET position, the engine is raced until tachometer 12 reads 7,500 RPM, and knob 22 is adjusted downwardly until the engine begins to falter. Adjustment of this maximum RPM level, designed to protect the engine and other parts against damage or destruction, may be checked by racing the engine to the desired set point to insure that it begins to falter. The line launch RPM adjustment may be checked in the same way when switch 68 is in the "on" position.

In operation, after adjustment of the potentiometer controlling gear-shifting RPM, and the two potentiometers controlling maximum engine RPM in the manner described, the driver places switch 26 in the RUN position before approaching the starting line. With the vehicle at the starting line awaiting the "go" signal, switch 56 is turned on (closed) and switch 68 is placed in the "on" position. The transmission is placed in first gear and the engine is raced to the maximum level permitted by the line launch RPM limiter, while holding the car stationary with the foot brake. Upon receiving the "go" signal, the brake is released and the accelerator pedal pushed to the floor, thereby closing switch 84 and energizing relay 66. The transmission will automatically be shifted from first to second, and from second to third gear each time the engine reaches the predetermined shift point RPM, and the engine will still be prevented from exceeding a safe RPM limit. At the conclusion of the race, the driver turns off (opens) switch 56, and places switch 68 in the "off" position, either before or after expiration of the time interval established by timer 80, which is selected to be a minute or more longer than the anticipated duration of the race.

From the foregoing, a number of advantages provided by the invention will be apparent. For example, the driver does not have to take his eyes off the course to watch the tachometer or an indicator light in order to shift gears at the desired RPM level. Also, shifting can be returned to the manual mode by the flip of a switch to permit experimentation with shifting at different RPM levels, and the predetermined automatic shifting RPM may be easily adjusted to different values. Furthermore, the maximum RPM levels both before and after leaving the starting line may be selectively and independently adjusted, and the maximum level is automatically changed from the first to the second predetermined value as the vehicle leaves the starting line.

What is claimed is:

1. In a drag racing car having an engine, an electrical power source, means for generating electrical signals commensurate with the rotational speed (RPM) of said engine, a tachometer providing a visual indication of said RPM, an automatic transmission having a neutral position and a plurality of forward gears, and a manually operable shifting lever movable to place said transmission in successively higher gears, the combination therewith of automatic shifting means for sequentially changing to a successively higher gear in response to said engine speed increasing to a selectively adjustable, predetermined RPM level from a lower RPM level, said automatic shifting means comprising:

(a) solenoid means including an armature movable in response to actuation of said solenoid;

(b) means coupling said armature to said shifting lever for movement of said shifting lever to change to a successively higher gear in response to movement of said armature;

(c) means limiting movement of said shifting lever to change by a single gear increment upon each actuation of said solenoid;

(d) relay means having contacts movable upon energization of said relay means to actuate said solenoid;

(e) means for actuating said relay means in response to said engine rpm reaching said predetermined level; and (f) manually adjustable means for selectively adjusting the value of said predetermined RPM level.

2. The invention according to claim 1 wherein said manually adjustable means comprise a potentiometer connected between said electrical power source and said relay means, and settable to a predetermined resistance at which power from said source is provided through said potentiometer to actuate said relay means, and thereby said solenoid.

3. The invention according to claim 2 and further including manually operable switch means interposed between said potentiometer and said relay means.

4. The invention according to claim 3 wherein said switch means comprises an on/off switch for selectively rendering said automatic shifting means operable and inoperable, said shifting lever being manually movable to change gears when said system is inoperable.

5. The invention according to claim 3 wherein said switch means is movable between first and second positions, wherein said tachometer provides a visual indication corresponding to actual RPM and twice actual RPM, respectively.

6. The invention according to claim 5 wherein said switch means includes at least two sets of contacts, one movable between said first and second positions and the other concurrently movable between positions wherein said potentiometer is connected to said relay to effect energization thereof in response to an output on the line from said potentiometer and wherein said potentiometer is connected to means providing a perceptable indication when said RPM reaches said predetermined level from a lower level.

7. The invention according to claim 1 and further including first and second potentiometer means alternatively connected to said tachometer, and operative when so connected to limit the maximum RPM of said engine at first and second levels, respectively.

8. The invention according to claim 7 and further including second relay means having contacts through which said first and second potentiometer means are alternatively connected to said tachometer by movement of said contacts between first and second positions, respectively.

9. The invention according to claim 8 and further including switch means movable from an open to a closed position to move said second relay contacts from said first to said second position thereof, thereby changing the one of said first and second potentiometer means which is connected to said tachometer and thus effective to control said maximum RPM level.

10. The invention according to claim 9 wherein said switch means is moved to said closed position thereof in response to fully opening said throttle.

11. The invention according to claim 10 and further including electronic timer means actuated in response to movement of said switch means to said closed position thereof, said timing means being effective upon actuation to establish a predetermined time period during which said second relay contacts remain in said second position thereof.

12. The invention according to claim 8 and further including manually operable switch means having first and second sets of switch contacts, each connected to said first potentiometer means and concurrently movable between a first position, wherein said switch contacts connect said first potentiometer means directly to said tachometer, and a second position, wherein said switch contacts connect said first potentiometer means to said second relay contacts for alternative connection by said second relay contacts of said first and second potentiometer means to said tachometer.

* * * * *